United States Patent
Sims, Jr. et al.

(10) Patent No.: US 7,385,326 B2
(45) Date of Patent: Jun. 10, 2008

(54) MOTOR PLATE

(75) Inventors: Dewey M. Sims, Jr., Wayne, MI (US); Hursha Shankaranarayan, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 11/321,439

(22) Filed: Dec. 29, 2005

(65) Prior Publication Data
US 2007/0152524 A1 Jul. 5, 2007

(51) Int. Cl.
*H02K 5/00* (2006.01)
(52) U.S. Cl. .......................................... 310/89; 310/91
(58) Field of Classification Search .................. 310/89, 310/91
See application file for complete search history.

(56) References Cited

U.S. PATENT DOCUMENTS

| | | | |
|---|---|---|---|
| 3,742,160 A * | 6/1973 | Murray et al. ............. 300/38 R |
| 3,854,916 A * | 12/1974 | Dochterman ................ 62/180 |
| 4,076,989 A * | 2/1978 | Watson ....................... 310/89 |
| 4,339,159 A | 7/1982 | Miller |
| 5,066,147 A | 11/1991 | Brandenstein et al. |
| 5,576,586 A * | 11/1996 | Blumenberg ................ 310/88 |
| 5,576,588 A * | 11/1996 | Moribayashi et al. .. 310/154.16 |
| 5,979,405 A | 11/1999 | Sato et al. |
| 5,992,378 A | 11/1999 | Parkinson |
| 6,006,722 A | 12/1999 | Hall |
| 6,543,413 B2 | 4/2003 | Lozen et al. |
| 6,628,028 B2 * | 9/2003 | Yoshida et al. ............... 310/91 |
| 7,105,976 B2 * | 9/2006 | Stewart et al. ............. 310/218 |
| 2003/0121498 A1 | 7/2003 | Lozen et al. |
| 2003/0210841 A1 | 11/2003 | Linden et al. |
| 2004/0123835 A1 | 7/2004 | Kawai et al. |
| 2007/0152524 A1* | 7/2007 | Sims et al. .................... 310/89 |

* cited by examiner

*Primary Examiner*—Darren Schuberg
*Assistant Examiner*—Hong-Vinh Nguyen
(74) *Attorney, Agent, or Firm*—Michael Best & Friedrich LLP

(57) ABSTRACT

A throttle body assembly including an end plate. The throttle body assembly includes a housing having an inner wall, and a motor located within the housing. The motor end plate is coupled to the motor and is in contact with the inner wall of the housing. The end plate includes an outer edge having at least one protrusion extending therefrom. The contact between the end plate and the housing is substantially only between the at least one protrusion on the outer edge of the end plate and the inner wall of the housing.

12 Claims, 7 Drawing Sheets

MOTOR PLATE

FIELD OF THE INVENTION

The invention relates to motors, and more particularly to motor plates for mounting motors within a housing.

BACKGROUND OF THE INVENTION

In many known industrial applications, a motor plate is used to secure a motor within a housing. Maximizing the amount of surface contact between the motor plate and the housing increases the stability of the motor within the housing. Thus, in many applications, such as within a throttle body for an automotive application, it is known to couple a motor to a motor end plate and then press fit the motor end plate into the interior of the housing. Thus, an outer edge of the end plate is interference fit with an inner surface of the housing about a large portion of the surface area of the outer edge of the end plate. In some cases, approximately 90% or more of the outer edge of the end plate is in contact with the inner surface of the housing.

SUMMARY OF THE INVENTION

The traditional interference fit configuration has drawbacks. For example, providing an interference fit between a large surface area of the end plate and the housing makes assembly difficult and can cause stress to concentrate in certain portions of the end plate, potentially causing deformation of portions of the end plate. Stress and deformation at the end plate can be further increased due to the thermal expansion characteristics of the interference fitted end plate and housing. The deformation can cause misalignment of the motor and other parts of the throttle body assembly that are operated by the motor (e.g., gears), and in some cases can cause the motor to seize.

Some other known configurations provide more clearance between the plate and machined features on the housing in an attempt to reduce the amount of stress passed through the plate, and thus to reduce the amount of deformation of the plate. However, this too has drawbacks as the clearance can cause shaft and gear alignment and clearance problems within the assembly.

The present invention provides a motor end plate that is designed to stably secure and accurately locate a motor within the housing, and yet reduce or at least localize the stress observed in the end plate, eliminating the stress concentrations in the bearing portion found in prior configurations. In one embodiment, the invention is directed to a throttle body assembly including a housing having an inner wall, and a motor located within the housing. An end plate is coupled to the motor and is in contact with the inner wall of the housing. The end plate includes an outer edge having at least one protrusion extending therefrom. The contact between the end plate and the housing is substantially only between the at least one protrusion on the outer edge of the end plate and the inner wall of the housing. In one embodiment, the contact is substantially a line contact between the protrusion and the inner wall of the housing. The line contact reduces and localizes the amount of stress observed in the end plate. Assembly is also made easier due to the engagement between the protrusion and the inner wall of the housing.

In one embodiment, the throttle body assembly includes a motor shaft coupled to the motor and extending through an aperture in the end plate. The motor shaft includes a gear thereon. A second gear intermeshes with the gear on the motor shaft and the line contact between the end plate and the housing assists in maintaining the gears in proper alignment by accurately locating the motor relative to the housing. In another embodiment, the end plate includes a bearing portion and the line contact between the end plate and the housing reduces the amount of stress passed to the bearing portion. In another embodiment, the protrusion extending from the outer edge of the end plate is substantially arcuate in shape and includes a radius of approximately five mm.

The invention also includes a method of installing a motor plate into a housing. The method includes providing a housing having an inner surface and providing at least one protrusion on an outer edge of a motor plate, the motor plate including a bearing portion configured to receive a bearing. The method further includes installing the motor plate within the housing such that substantially only the at least one protrusion contacts the inner surface of the housing.

Other features and advantages of the invention will become apparent to those skilled in the art upon review of the following detailed description, claims, and drawings.

Figure 1:
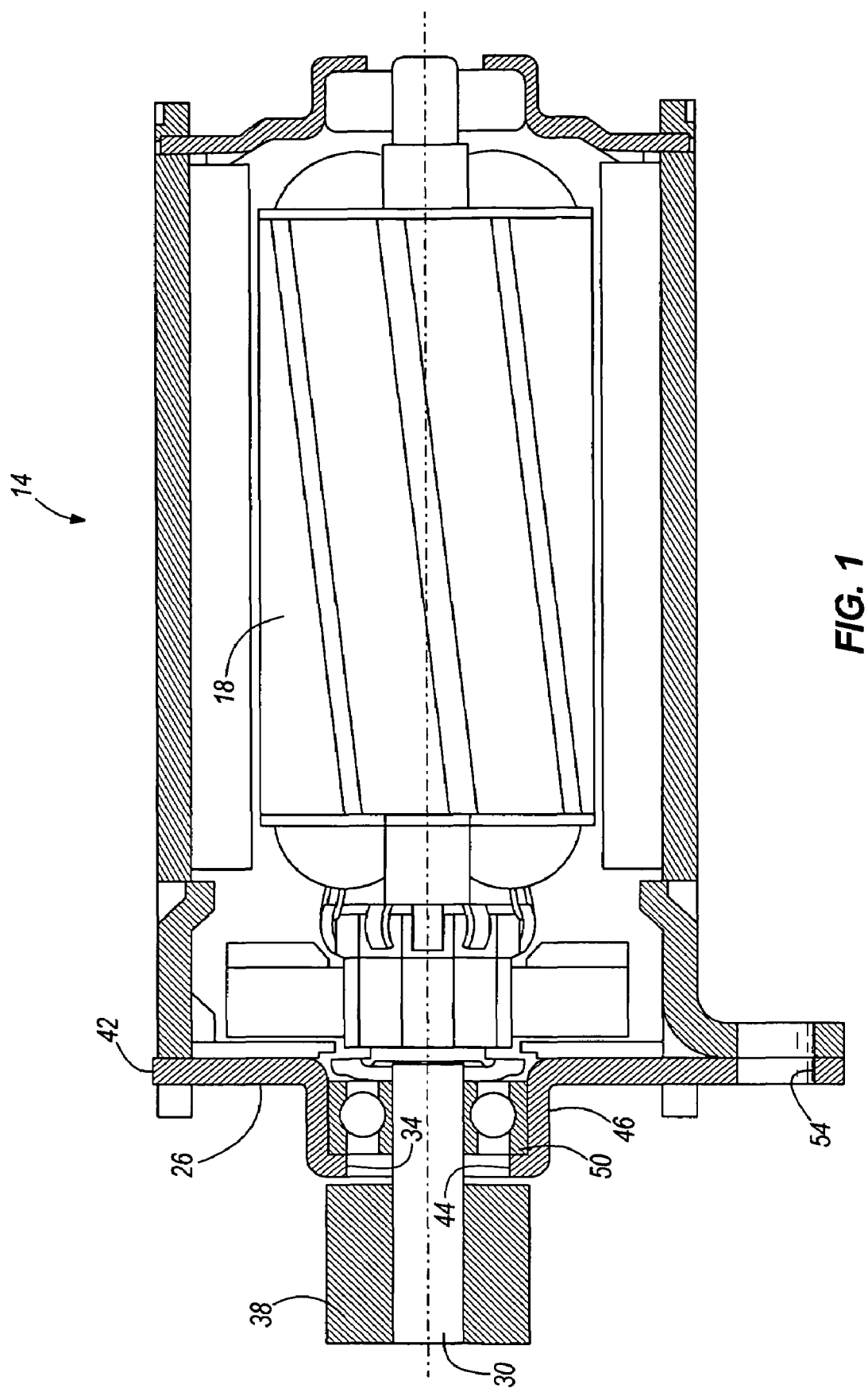
FIG. 1 is a section view of a throttle body assembly, illustrating aspects of the invention including a motor end plate.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including," "having," and "comprising" and variations thereof herein is meant to encompass the items listed thereafter and equivalents thereof as well as additional items.

DETAILED DESCRIPTION

Figure 2:
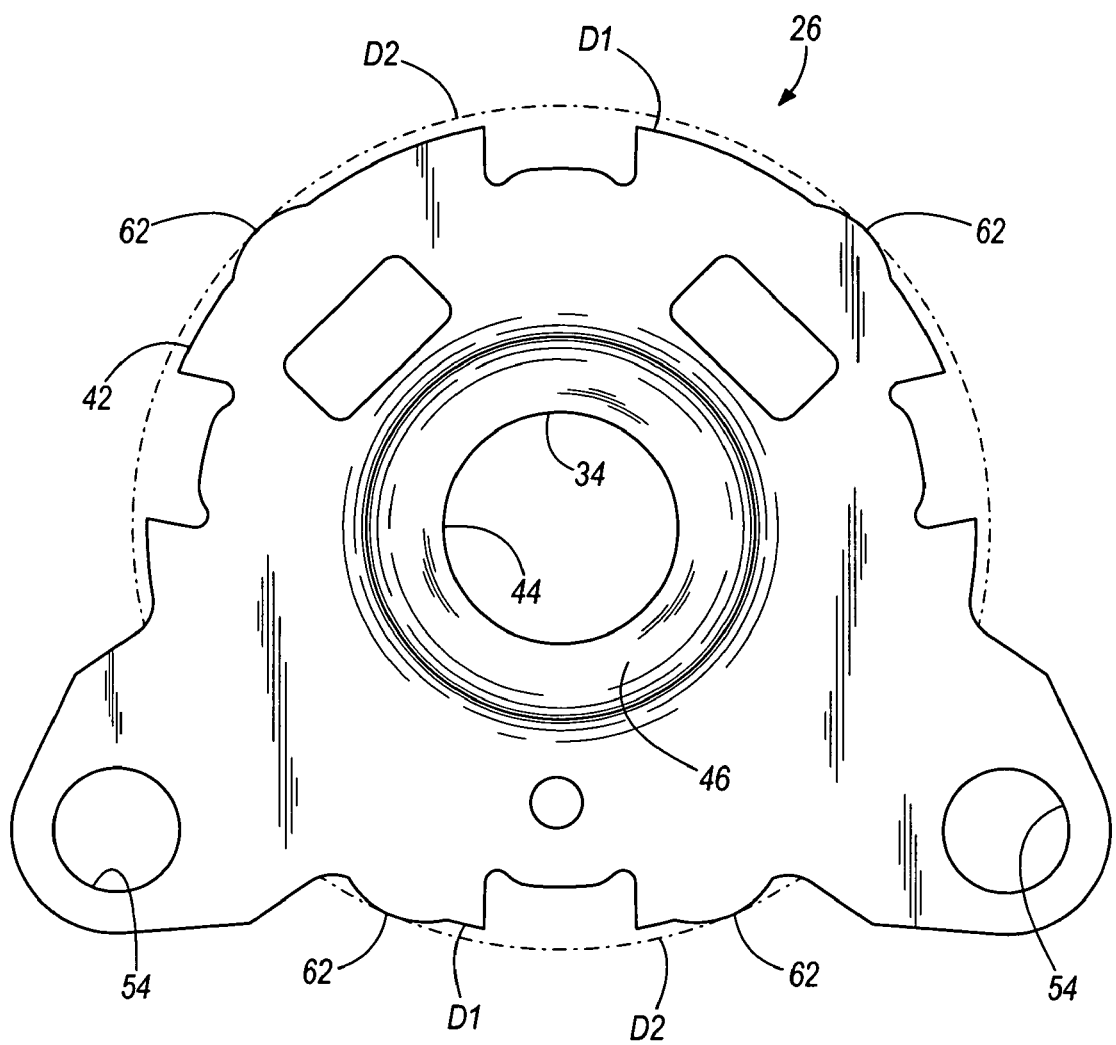
FIG. 2 is a top view of the motor end plate of FIG. 1
Figure 3:
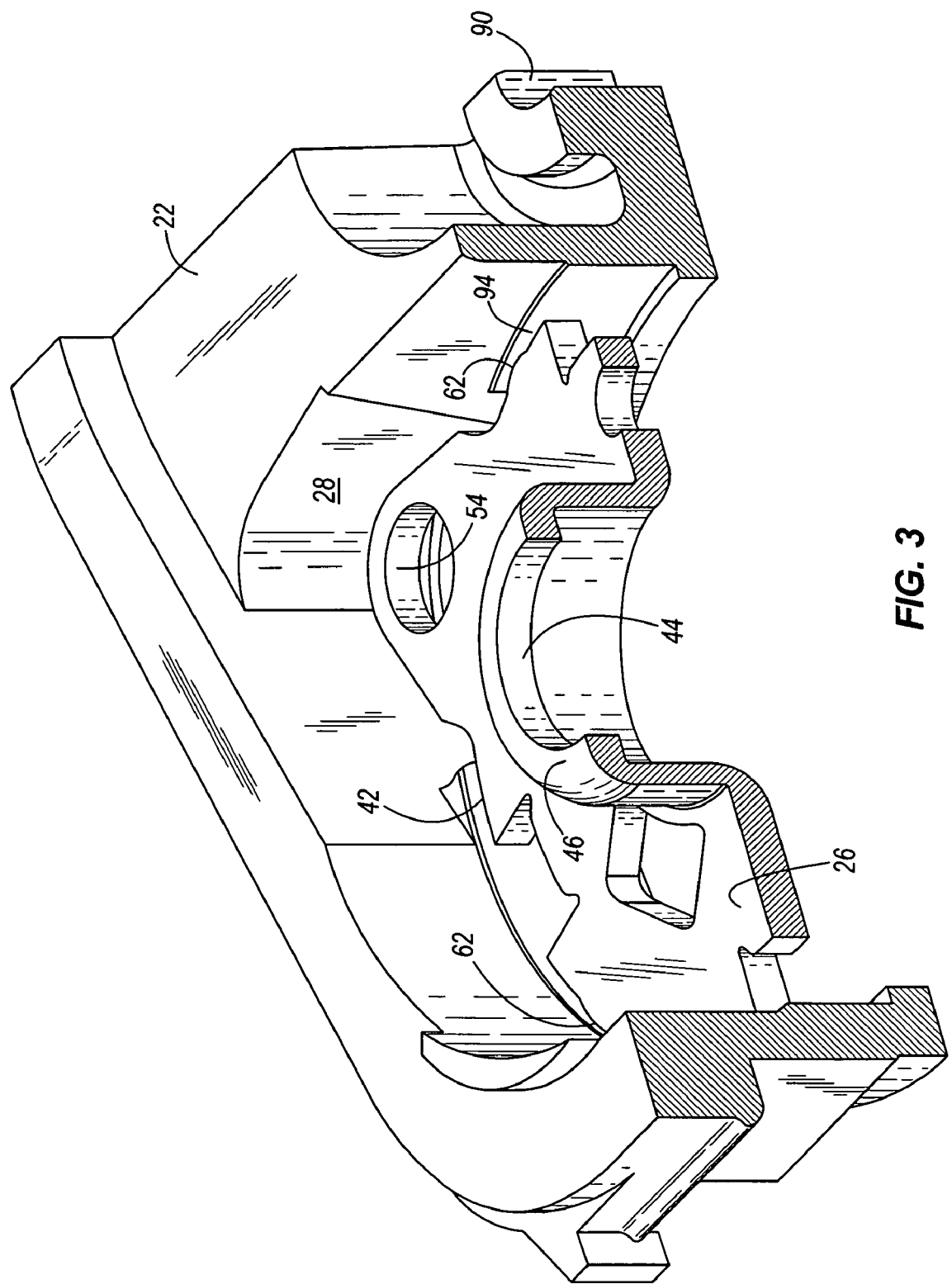
FIG. 3 is a perspective section view of the motor end plate of FIG. 1, illustrating the motor end plate seated within a housing.

FIGS. 1-3 illustrate portions of a throttle body assembly 14 embodying aspects of the invention. The throttle body assembly 14 includes a motor 18 mounted within a housing 22 (shown in FIG. 3). The motor 18 is secured within the housing 22 via a motor end plate 26 that is press fit within the housing 22. The housing includes an inner surface 28. The housing 22 and the motor end plate 26 are made of different materials, each having a different thermal coefficient of expansion. In the illustrated embodiment, the housing 22 is constructed of aluminum, and the end plate 26 is constructed of steel, though other materials could be used.

Figure 4:
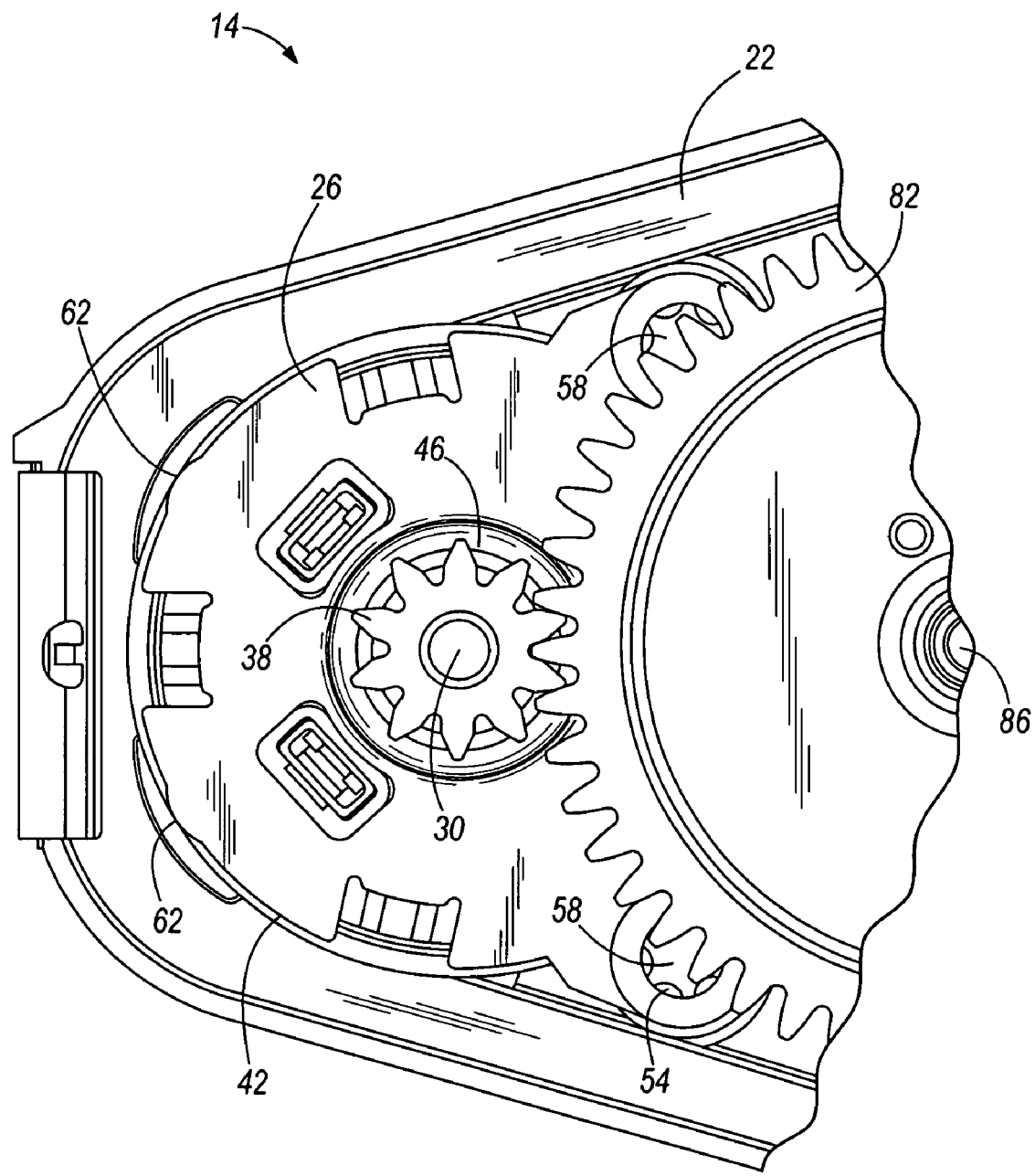
FIG. 4 is a partial top view of the throttle body assembly of FIG. 1, illustrating the motor end plate within the housing.

A motor shaft 30 is coupled to the motor 18 at one end and extends outwardly from the motor 18 and through an aperture 34 in the motor end plate 26. As shown in FIGS. 1 and 4, a gear 38 is coupled to the opposite end of the motor shaft 30 from the motor 18.

FIG. 2 illustrates the motor end plate 26 in more detail. The end plate 26 includes a body having a generally planar portion with an outer edge 42. An inner edge 44 of the end plate 26 defines the aperture 34. The body of the end plate 26 also includes a bearing portion 46 that is defined, in part, by the inner edge 44. The bearing portion 46 is generally cup shaped to securely house a bearing 50 when assembled in the throttle body assembly 14. The bearing 50 allows for rotation of the motor shaft 30 within the aperture 34 when the motor 18 is in operation (see FIG. 1). In the illustrated embodiment, the bearing 50 is press-fit into the bearing portion 46 of the end plate 26.

The end plate 26 also includes connection apertures 54 that receive a fastener 58 (shown in FIG. 4) to further secure the end plate 26 relative to the housing 22. The fasteners 58 function to anchor the end plate 26 into position with respect to the housing 22 by eliminating any axial motion of the end plate 26 with respect to the housing 22. The fasteners 58 in the illustrated embodiment are bolts. However, it is understood that any known fastener, such as a bolt, screw, nail, rod, etc., can be used to fasten the end plate 26 to the housing 22.

As further illustrated in FIG. 2, a number of protrusions 62 extend outwardly from the outer edge 42 of the end plate 26. In the illustrated embodiment, four protrusions 62 are formed on the outer edge 42, though it is understood that more or fewer protrusions (e.g., 1, 2, 3, 5, 6, etc.) could be used and still fall within the scope of the invention. As also shown in FIG. 2, the outer edge 42 of the end plate 26 defines a first diameter D1 at the locations adjacent the protrusions 62, and the protrusions 62 define a second, larger diameter D2. The outer edge 42 does not contact the inner surface 28 of the housing 22 at any point along the diameter D1, but rather only contacts the inner surface 28 along the diameter D2 at the protrusions 62. In the illustrated embodiment, the difference between diameters D1 and D2 is about 0.2 mm.

The protrusions 62 result in a substantially line contact between the end plate 26 and the inner surface 28 of the housing 22 (as viewed in three-dimensions) at each of the locations of the protrusions 62 when the end plate 26 is press-fit into the housing 22. When looking down at the end plate 26 press-fit into the housing 22 (i.e., in a two-dimensional view), the protrusions result in a substantially point contact between the plate 26 and the housing 22. The width of line contact at minimum tolerance material conditions are of the order of 0.0001 mm. At maximum tolerance material conditions, the protrusions 62 are slightly compressed with respect to the housing 22 and result in widths of line contact on the order of 0.003 to 0.005 mm.

The surface-to-surface contacts between the protrusions 62 and the inner surface 28 are the only points of contact between the outer edge 42 and the inner surface 28. In the illustrated embodiment, approximately only 1% of the outer edge 42 of the end plate 26 contacts the inner surface 28 of the housing 22. By having only line contacts between the protrusions 62 on the end plate 26 and the housing 22 (as opposed to an interference fit with a substantially greater surface area of contact, or a complete interference fit about the edge of the end plate), the force needed to assemble the plate into the housing is significantly reduced, making the throttle body assembly 14 easier to assemble.

FIG. 4 illustrates a top view of a portion of the throttle body assembly 14, including the gear 38. The gear 38 intermeshes with a second gear 82 that rides on a shaft 86 extending through a shaft aperture 90 in the housing 22 (see FIG. 3).

Another feature of the protrusions 62 is that the protrusions 62 act to center the end plate 26, and thus the motor 18, within the housing 22. More specifically, the protrusions 62 are configured and located to allow the motor 18 to be held concentric with a machined surface portion 94 of the inner surface 28 of the housing 22. The gears 38, 82 should be maintained in proper alignment and contact to reduce the wear on the gear teeth and to maintain the proper gear ratio (or gear meshing). Excessive wear or improper gear meshing could disrupt the functioning of the throttle body assembly 14. Improper gear meshing could result in more interference between the gear teeth and would increase the wear rate of the gears. By keeping the end plate 26 concentric with the machined surface portion 94, the correct gear ratio is maintained.

Figure 5:
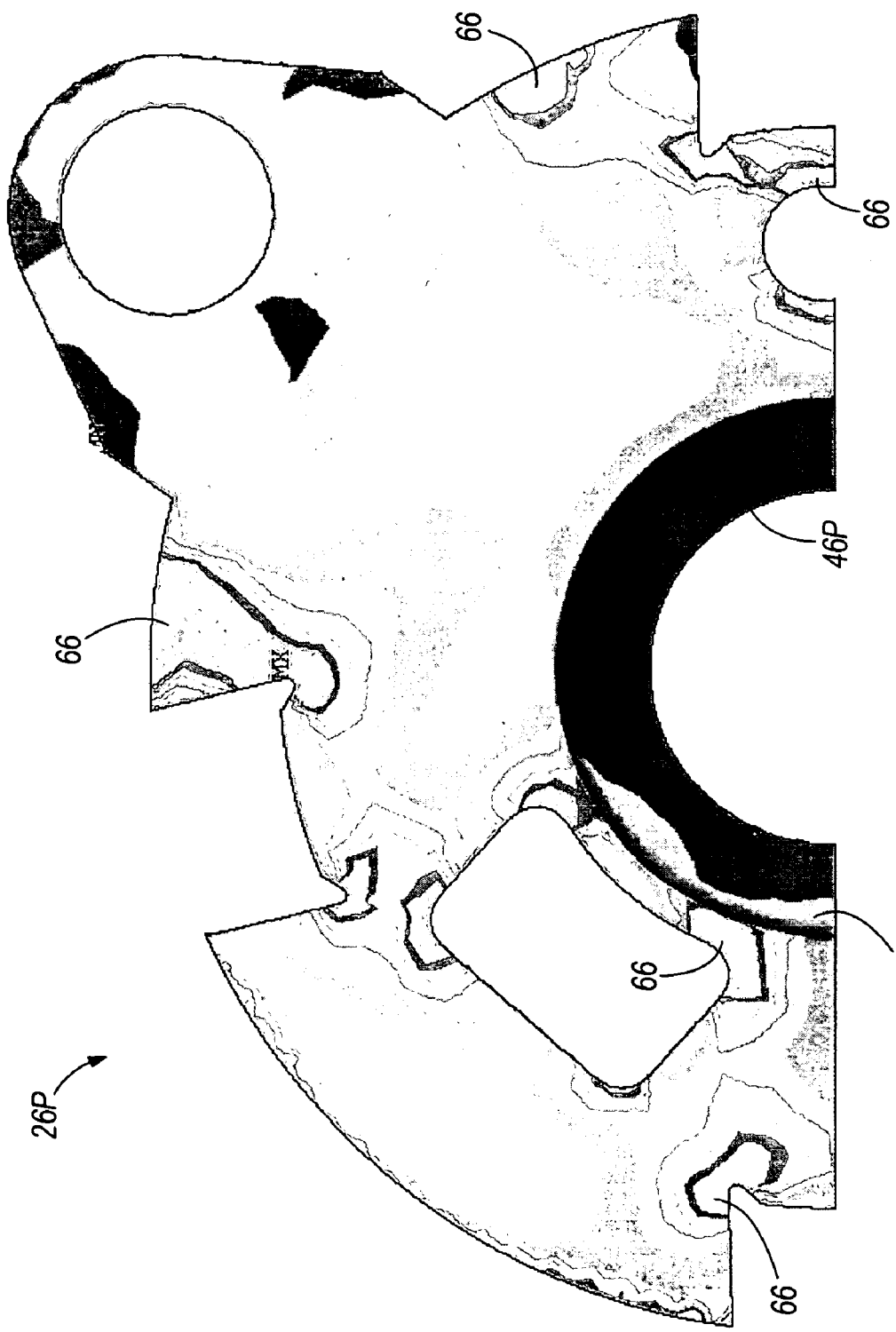
FIG. 5 is a rendering of FEA stress analysis results of a prior art motor end plate.

As discussed above, known end plate configurations utilize interference fits having much more surface-to-surface contact between the inner surface of the housing and the end plate. An interference fit that results in large surface area contact about the edge of the end plate (e.g., 90% interference fit) results in higher loads on the bearing portion and can cause deformation of the bearing portion at maximum tolerance material conditions. The interference fit and bearing portion deformation of one prior art end plate 26P construction is illustrated in the FEA stress analysis image shown in FIG. 5. The FEA analysis shows areas of stress concentration 66 on the prior art end plate 26P, and illustrates an area of deformation 70 on the bearing portion 46P. Deformation of the bearing portion can cause misalignment of the shaft 30 within the aperture 34, and in some cases can cause the bearing 50 to seize, thereby seizing or disrupting motor functions.

Essentially, the interference fit and large area of surface contact causes the stress on the steel end plate 26P to concentrate internally, including in the bearing portion 46P. The thermal expansion of the end plate 26P and the housing, and the fact that the two parts are typically made of different materials having different coefficients of thermal expansion, can further exacerbate the stress concentrations.

Figure 6:
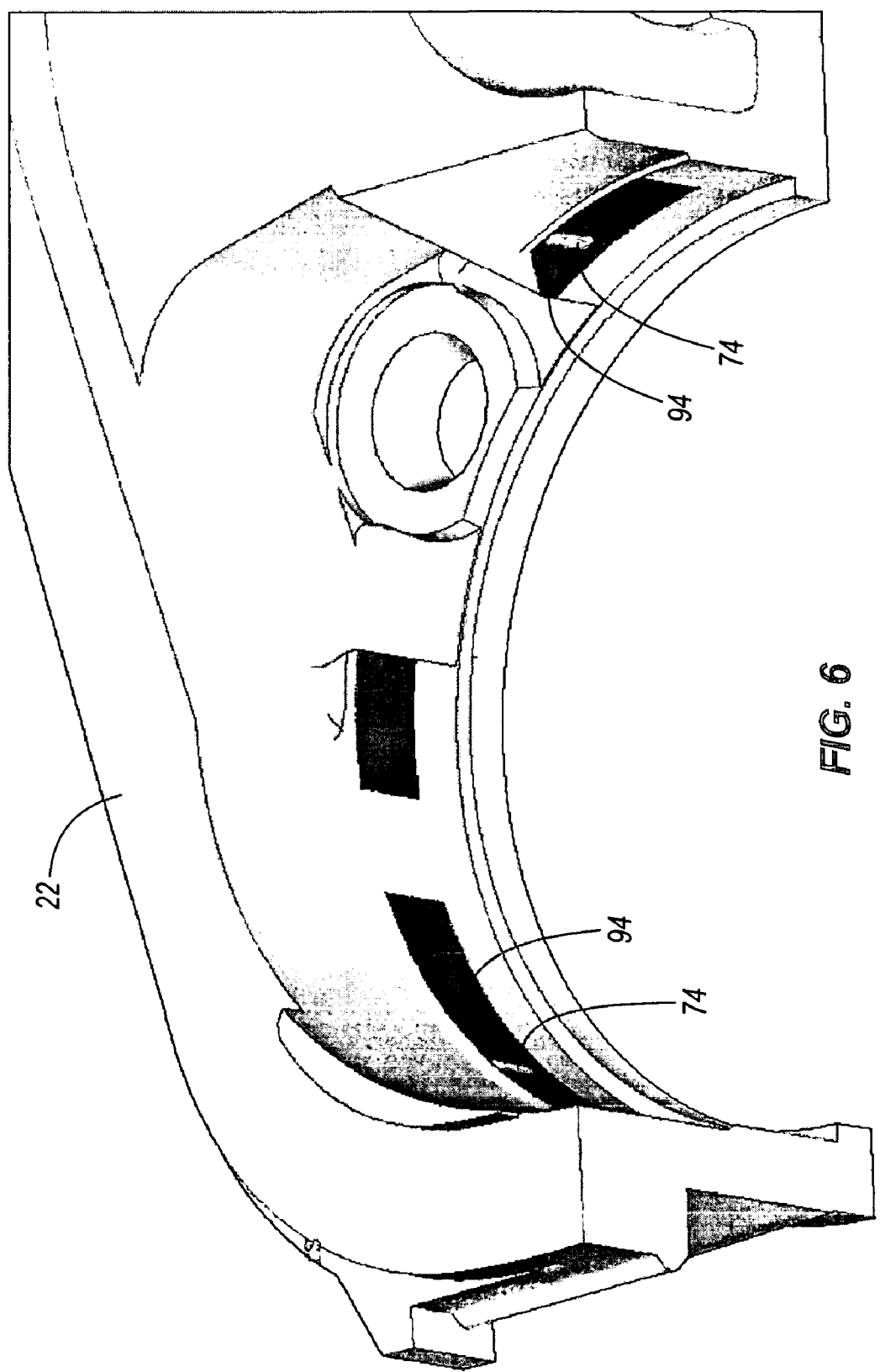
FIGS. 6 and 7 are renderings of FEA stress analysis results of the motor end plate and housing of FIG. 3.
Figure 7:

As shown in FIGS. 6 and 7, the minimal areas of line contact created by the protrusions 62, illustrated by the small stress points 74 on the housing in FIG. 6, and small stress points 78 on the end plate 26 in FIG. 7, diminish the stress concentration in the end plate 26 and redirect the stress through the protrusions 62 into the housing 22. The stress in the end plate 26 is substantially concentrated at the protrusions 62 and is not transmitted to the bearing portion as in prior configurations. Thus, the possibility of deformation of the bearing portion 46 is substantially eliminated because the stress in the bearing portion is substantially reduced and/or eliminated.

The illustrated protrusions 62 are generally arcuate in configuration and, in the illustrated embodiment, have a radius of approximately five mm. The radius of the protrusions is selected to optimize the contact area between the protrusions 62 and the housing 22 to ensure that the end plate 26 is firmly seated within the housing 22, while at the same time minimizing the stress on the bearing portion 46 at worst case conditions (i.e., −48 degrees Celsius and maximum tolerance material conditions). It is understood that the actual configuration of the protrusions, including both shape and size, can vary from the configuration discussed above and still fall within the invention so long as the configuration of the protrusions produces the desired results (i.e., alignment of the motor shaft and reduction of stress internal to the end plate) even at the worst case conditions. It is also understood that in embodiments where multiple protrusions 62 are utilized, each of the protrusions 62 can have a different radius from the other protrusions.

The location of the end plate 26 defines the location of the motor 18, the shaft 30, and thus the location of the gear 38. As the temperatures in which the throttle body assembly 14 operates change, the gear ratio (or gear meshing) is consistent due to the substantially line contacts the protrusions 62 create between the end plate 26 and the housing 22. The protrusions 62 allow for thermal expansion and contraction of the materials of the end plate 26 and the housing 22 without substantially changing the load on the bearing portion 46. In fact, compared to prior art configurations, the protrusions 62 reduce or substantially remove the load on the bearing portion 46.

Various features of the invention can be found in the following claims.

We claim:

1. A throttle body assembly comprising:
   a housing having an inner wall;
   a motor located within the housing; and
   an end plate coupled to the motor and in contact with the inner wall of the housing, the end plate including an outer edge having at least one protrusion extending therefrom;
   wherein the contact between the end plate and the inner wall of the housing is only between the at least one protrusion on the outer edge of the end plate and the inner wall of the housing.

2. The throttle body assembly of claim 1, further comprising a motor shaft coupled to the motor and extending through an aperture in the end plate, the motor shaft including a gear coupled thereon.

3. The throttle body assembly of claim 2, further comprising a second gear intermeshing with the gear on the motor shaft, wherein the contact between the end plate and the housing assists in maintaining the gears in proper alignment.

4. The throttle body assembly of claim 1, wherein the end plate includes a bearing portion, and wherein the contact between the end plate and the housing reduces the amount of stress observed in the bearing portion.

5. The throttle body assembly of claim 4, wherein the bearing portion is generally cup shaped and contains a bearing.

6. The throttle body assembly of claim 1, further comprising multiple protrusions extending from the outer edge of the end plate, each of the protrusions contacting the inner wall of the housing.

7. The throttle body assembly of claim 6, wherein the outer edge of the end plate defines a first diameter, and the protrusions define a second diameter, and wherein the contact between the end plate and the housing occurs only about portions of the second diameter.

8. The throttle body assembly of claim 1, further comprising four protrusions spaced about the outer edge of the end plate, and wherein the contact between the end plate and the housing is substantially only at each of the four protrusions.

9. The throttle body assembly of claim 1, wherein the protrusion extending from the outer edge of the end plate is substantially arcuate in shape.

10. The throttle body assembly of claim 9, wherein the protrusion has a radius of approximately five mm.

11. The throttle body assembly of claim 1, wherein the end plate and the housing are made of different materials having different coefficients of thermal expansion.

12. The throttle body assembly of claim 1, wherein the contact between the end plate and the housing is substantially a line contact between the at least one protrusion and the inner wall of the housing.

* * * * *